United States Patent
Jalloul et al.

(10) Patent No.: US 9,496,933 B2
(45) Date of Patent: Nov. 15, 2016

(54) BASE STATION SIMULTANEOUSLY SERVICING LEGACY CELLULAR AND MASSIVE MULTIPLE-INPUT, MULTIPLE-OUTPUT

(71) Applicant: Broadcom Corporation, Irvine, CA (US)

(72) Inventors: Louay Jalloul, San Jose, CA (US); Amin Mobasher, Menlo Park, CA (US); Nihar Jindal, Mountain View, CA (US); Sam Alex, Sunnyvale, CA (US); Murat Mese, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 74 days.

(21) Appl. No.: 14/142,310

(22) Filed: Dec. 27, 2013

(65) Prior Publication Data

US 2015/0162961 A1   Jun. 11, 2015

Related U.S. Application Data

(60) Provisional application No. 61/914,896, filed on Dec. 11, 2013, provisional application No. 61/813,337, filed on Apr. 18, 2013.

(51) Int. Cl.

| | |
|---|---|
| *H04W 4/00* | (2009.01) |
| *H04B 7/04* | (2006.01) |
| *H04L 5/00* | (2006.01) |
| *H04B 7/06* | (2006.01) |
| *H04W 88/10* | (2009.01) |

(52) U.S. Cl.
CPC .......... *H04B 7/0452* (2013.01); *H04B 7/0689* (2013.01); *H04L 5/0053* (2013.01); *H04L 5/0005* (2013.01); *H04L 5/0007* (2013.01); *H04W 88/10* (2013.01)

(58) Field of Classification Search
CPC ..................................... H04L 5/0053
USPC ......................................... 370/330
See application file for complete search history.

(56) References Cited

U.S. PATENT DOCUMENTS

| | | | |
|---|---|---|---|
| 2013/0094477 A1* | 4/2013 | Liu et al. ...................... | 370/335 |
| 2013/0182594 A1* | 7/2013 | Kim et al. .................... | 370/252 |
| 2013/0272263 A1* | 10/2013 | Pi et al. ........................ | 370/330 |
| 2013/0286960 A1* | 10/2013 | Li et al. ........................ | 370/329 |
| 2015/0049824 A1* | 2/2015 | Kim ..................... | H04B 7/0456 |
| | | | 375/267 |

\* cited by examiner

*Primary Examiner* — Wei Zhao
(74) *Attorney, Agent, or Firm* — Sterne, Kessler, Goldstein & Fox P.L.L.C.

(57) ABSTRACT

As wireless networks evolve, network providers may utilize legacy LTE devices as well as devices that support massive multi-input, multiple output (M-MIMO). Systems and methods for simultaneously servicing legacy LTE devices and M-MIMO devices are provided. In embodiments, a transmission zone for M-MIMO communications is defined within a legacy, non M-MIMO radio frame. The location of the M-MIMO transmission zone is transmitted to user devices. For example, an identification of the location of the M-MIMO transmission zone is transmitted in a system information message. In a further example, the location of the M-MIMO transmission zone is transmitted in the downlink control information. The location of the M-MIMO transmission zone may be defined dynamically based on a variety of criteria. In addition or alternatively, a set of pre-defined transmission zones may be utilized.

20 Claims, 12 Drawing Sheets

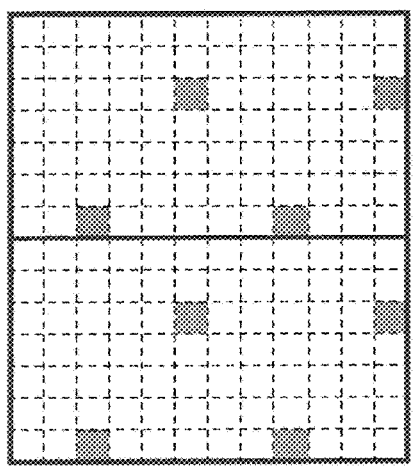
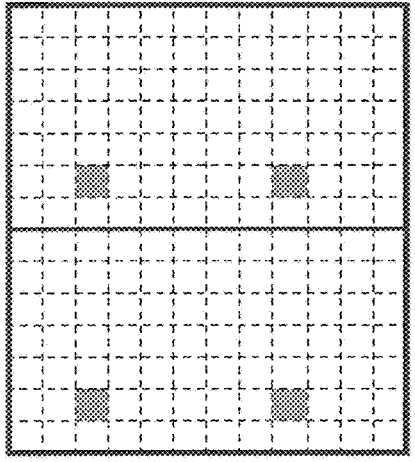
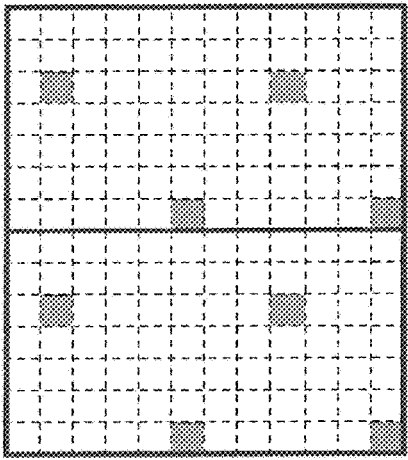
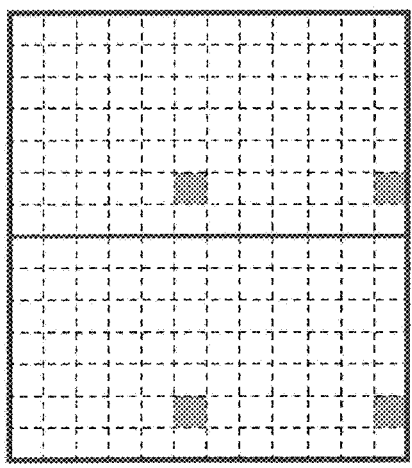
FIG. 4B

BASE STATION SIMULTANEOUSLY SERVICING LEGACY CELLULAR AND MASSIVE MULTIPLE-INPUT, MULTIPLE-OUTPUT

CROSS REFERENCE TO RELATED APPLICATIONS

This application claims the benefit of U.S. Provisional Patent Application No. 61/914,896, filed Dec. 11, 2013, which is incorporated by reference herein in its entirety. This application also claims the benefit of U.S. Provisional Patent Application No. 61/813,337 filed Apr. 18, 2013.

FIELD OF THE INVENTION

The present disclosure relates generally to wireless communications including systems using massive multiple-input multiple output (MIMO).

BACKGROUND

Wireless networks have evolved from systems having a single antenna to systems having a limited number of multiple antennas (e.g., 2 or 4) supporting multiple input, multiple output (MIMO) communications. These systems may be referred to as legacy LTE systems. Recently, wireless networks have evolved to include base stations with a large number of antenna elements (often 100 or more). These systems are referred to as massive MIMO (M-MIMO) systems. It is possible that the users are also equipped with a large number of antenna elements.

M-MIMO systems provide benefits such as increased bandwidth and increased downlink beamformed gain. However, M-MIMO utilizes different pilot structures and procedures for channel estimation than legacy LTE systems. As networks evolve, the ability for M-MIMO and legacy LTE to coexist and interwork efficiently is crucial.

BRIEF DESCRIPTION OF THE DRAWINGS/FIGURES

FIG. 4B illustrates an exemplary pilot structure for a base station having four antenna ports in a legacy LTE system.

Figure 11:
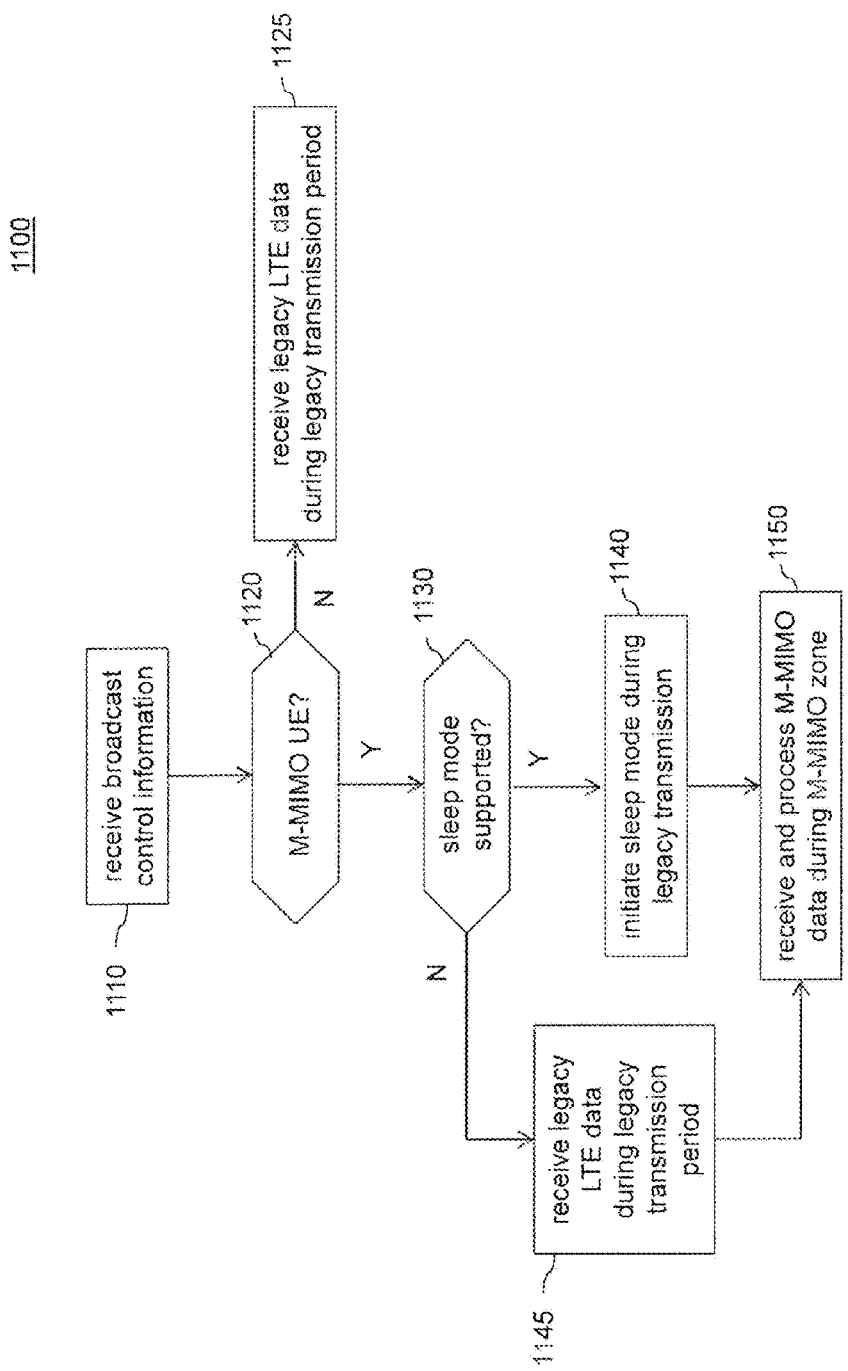

FIG. 11 depicts a flowchart of a method for supporting legacy LTE and M-MIMO coexistence from the perspective of the user device, according to embodiments of the present invention The disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE DISCLOSURE

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

As wireless networks evolve, a network may support both legacy LTE 3-4G network interface devices (e.g., base stations or eNBs) as well as M-MIMO network interface devices. Additionally, in these configurations, a single base station or eNB may utilize both a M-MIMO antenna array and a legacy LTE 3-4G antenna. The ability for legacy LTE and M-MIMO to coexist is valuable, particularly when considered in light of underlying network characteristics. For example, M-MIMO tends to exhibit spotty coverage such as "shadowing" due to beam drop out from non-line of sight situations. However, M-MIMO also supports very bursty high bandwidth behavior. Legacy LTE systems, on the other hand, do not reach the same level of throughput as M-MIMO but provide better continuous coverage than M-MIMO.

Embodiments of the disclosure present methods and systems for coexistence between legacy and M-MIMO system through a common transmission framing structure for both legacy LTE and M-MIMO devices. For example, if a user device does not have M-MIMO capabilities, legacy LTE data and control information is available. If a user device has M-MIMO capabilities, scheduling of M-MIMO data and control is provided.

Figure 1:
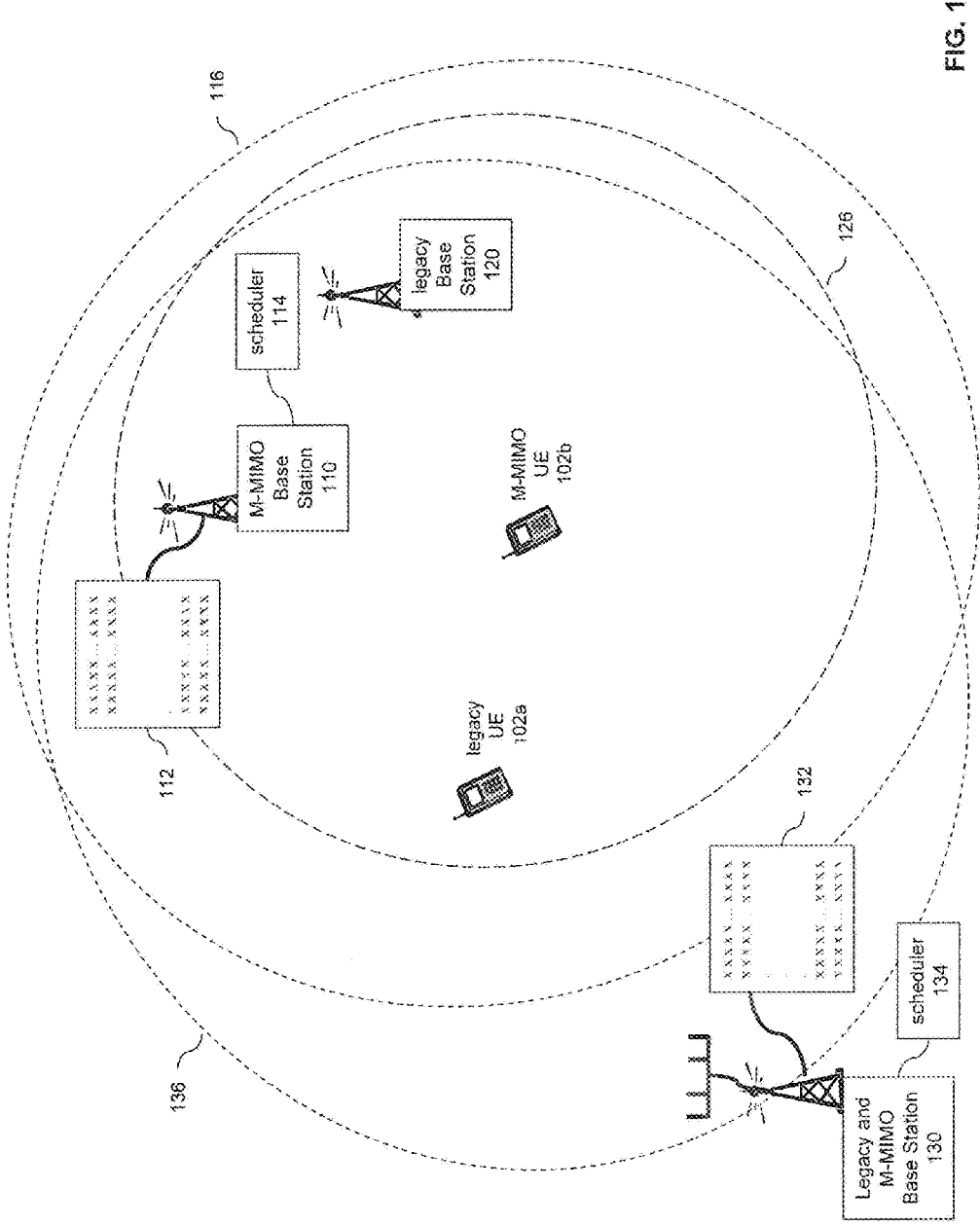
FIG. 1 depicts an exemplary operating environment for servicing legacy cellular (e.g., LTE) and M-MIMO, according to embodiments of the present disclosure.

FIG. 1 depicts an exemplary operating environment 100 for servicing legacy cellular (e.g. LTE) and M-MIMO, according to embodiments of the present disclosure. Operating environment 100 includes multiple base stations. Base station 110 is a M-MIMO base station having an antenna array 112. Antenna array 112 has a large number of antenna elements (e.g., hundreds). Base station 110 has a coverage area 116.

Base station 120 is a legacy base station. Legacy base station may have a single antenna or a limited number of antenna elements (e.g., 2, 4, or 8). Legacy base station 120 has a coverage area 126. Coverage area 116 of legacy base station 120 is typically smaller than the coverage area 126 for a M-MIMO base station. Operating environment 100 may be arranged so that the coverage area 126 of legacy base station 120 overlaps with the coverage area 116 of M-MIMO base station 110.

Base station 130 is a base station including both a M-MIMO antenna array 132 and a legacy LTE antenna configuration. Base station 130 has a coverage area 136 associated with the M-MIMO antenna array 132 and a coverage area associated with the legacy LTE antenna configuration. The coverage area for the M-MIMO antenna array 132 may be positioned to overlap with the coverage area of the legacy LTE antenna configuration.

Operating environment 100 may also include multiple user devices 102, also referred to as user equipment (UE). User devices 102 may include legacy user devices 102a and M-MIMO user devices 102b. Legacy user devices 102a do not have M-MIMO capabilities. Therefore, these devices can only process legacy LTE transmissions. M-MIMO user devices 102b may have both M-MIMO and legacy LTE capabilities. These dual mode devices can therefore process both legacy LTE transmission and M-MIMO transmission. Alternatively, the M-MIMO device may have only M-MIMO capabilities.

Massive MIMO base station 110 and legacy and M-MIMO base station 130 may also include a scheduler 114/134. Scheduler 114/134 is configured to determine the schedule for a M-MIMO transmission zone. The M-MIMO transmission zone includes M-MIMO reference signals interspersed with M-MIMO downlink data transmission. The structure for a M-MIMO transmission zone is described in further detail below.

Figure 2:
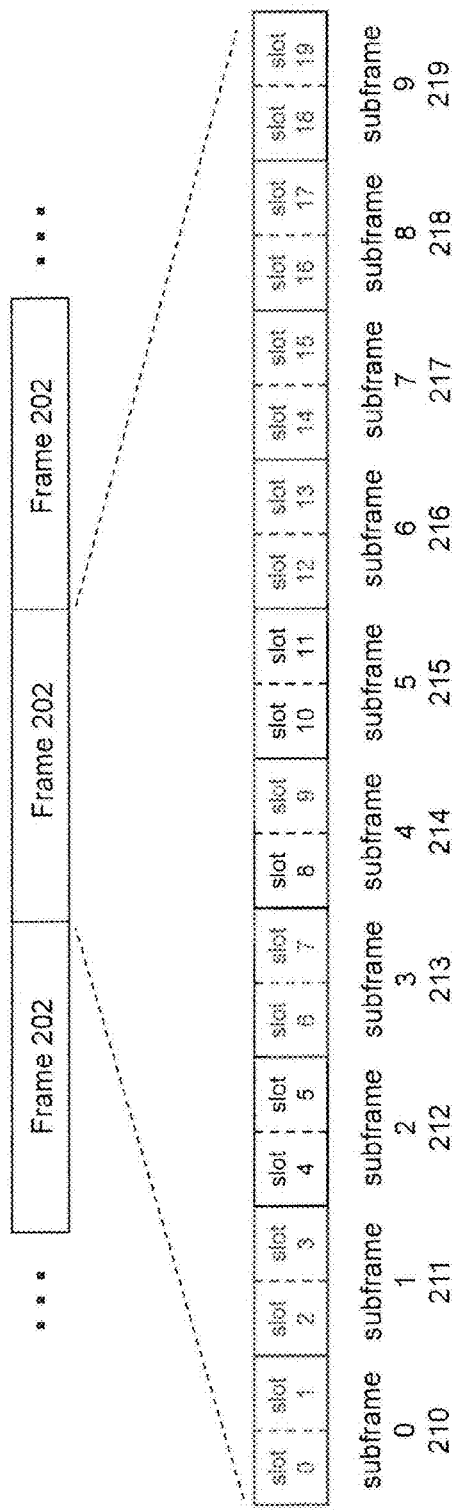
FIG. 2 depicts an exemplary structure for LTE transmissions.

FIG. 2 depicts an exemplary structure for LTE transmissions. Generally, LTE transmissions utilize a series of frames 202 having a length of 10 ms. A frame is identified by its associated System Frame Number (SFN). Each frame 202 is further divided into 10 subframes 210-219. Each subframe is 1 ms in length. Each subframe is further divided into two slots of 0.5 ms.

Figure 3:
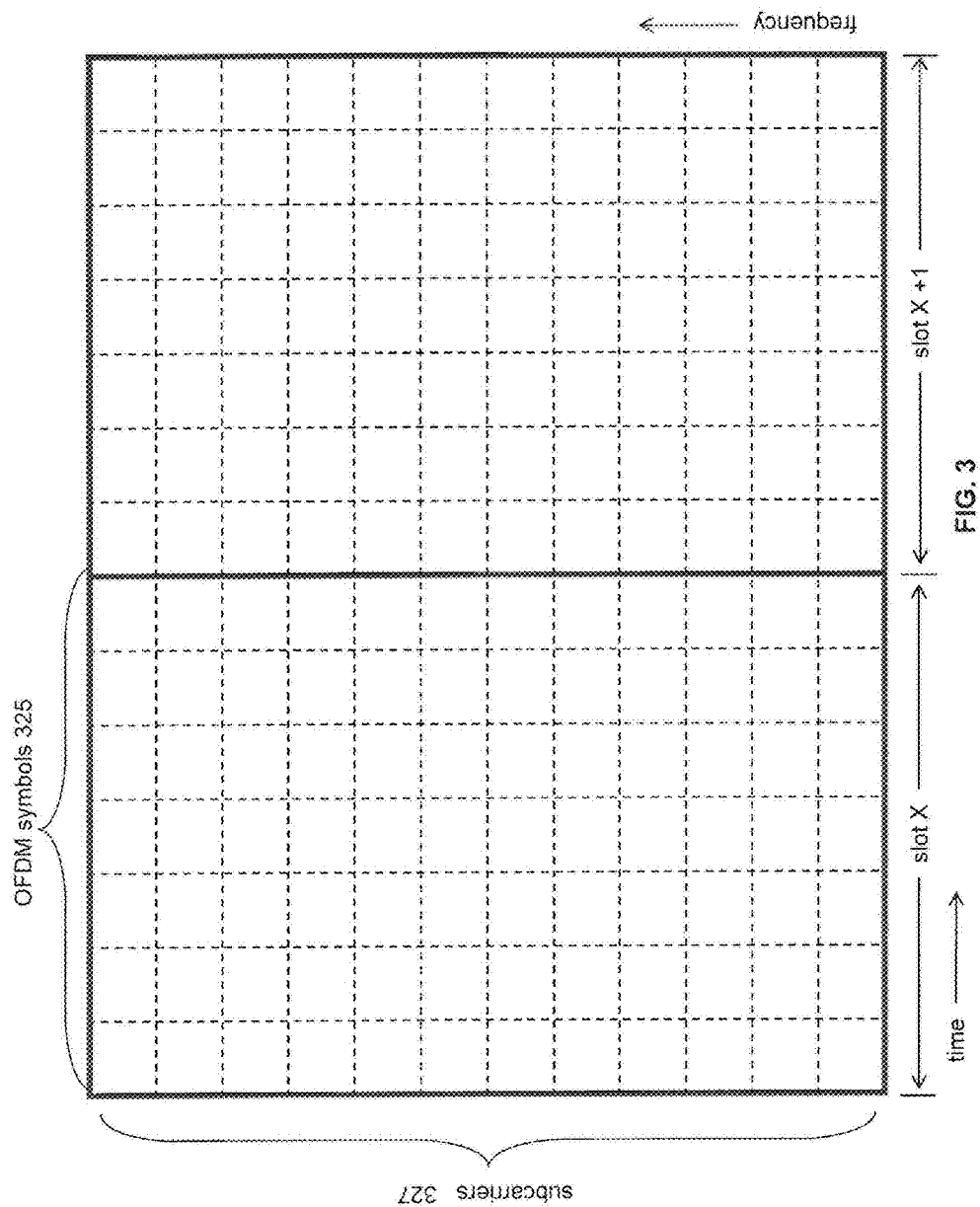
FIG. 3 illustrates an LTE subframe.

As illustrated in FIG. 3, a slot in a legacy LTE subframe may be further divided into OFDM symbols 325 in the time domain and subcarriers 327 in the frequency domain. In the example of FIG. 3, a slot is illustrated as having 7 OFDM symbols and 12 subcarriers. As would be appreciated by a person of ordinary skill in the art, other configurations could be utilized.

Figure 4A:
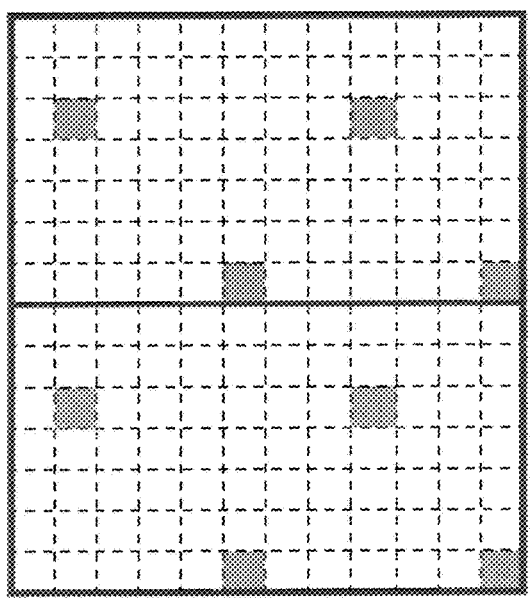
FIG. 4A illustrates an exemplary pilot structure for one antenna port in a legacy LTE system.

In legacy LTE, cell-specific reference signals (also referred to as pilot signals) are transmitted in every downlink subframe. These pilot signals are utilized by a user device to acquire channel state information (CSI). The format for legacy LTE pilots is dependent upon the number of corresponding antenna ports used by the base station. FIG. 4A illustrates an exemplary pilot structure for one antenna port in a legacy LTE system. FIG. 4B illustrates an exemplary pilot structure for a base station having four antenna ports in a legacy LTE system. As illustrated in FIGS. 4A and 4B, pilot signals are interspersed with data in the downlink slot.

The downlink pilot structure for legacy LTE is not practical for M-MIMO where a base station can have hundreds of antenna elements. M-MIMO utilizes a different downlink pilot structure and therefore channel estimation at a user device is handled differently for M-MIMO. That is, a user device supporting only legacy LTE cannot interpret the M-MIMO pilot structure used by M-MIMO.

Embodiments of the present disclosure partition the legacy LTE transmission frames described above to support both legacy LTE and M-MIMO transmissions. As described below, LTE frame partitioning can be either in the time domain or in both the time and frequency domains. The partition containing the M-MIMO transmission is referred herein as the M-MIMO transmission zone.

Figure 5:
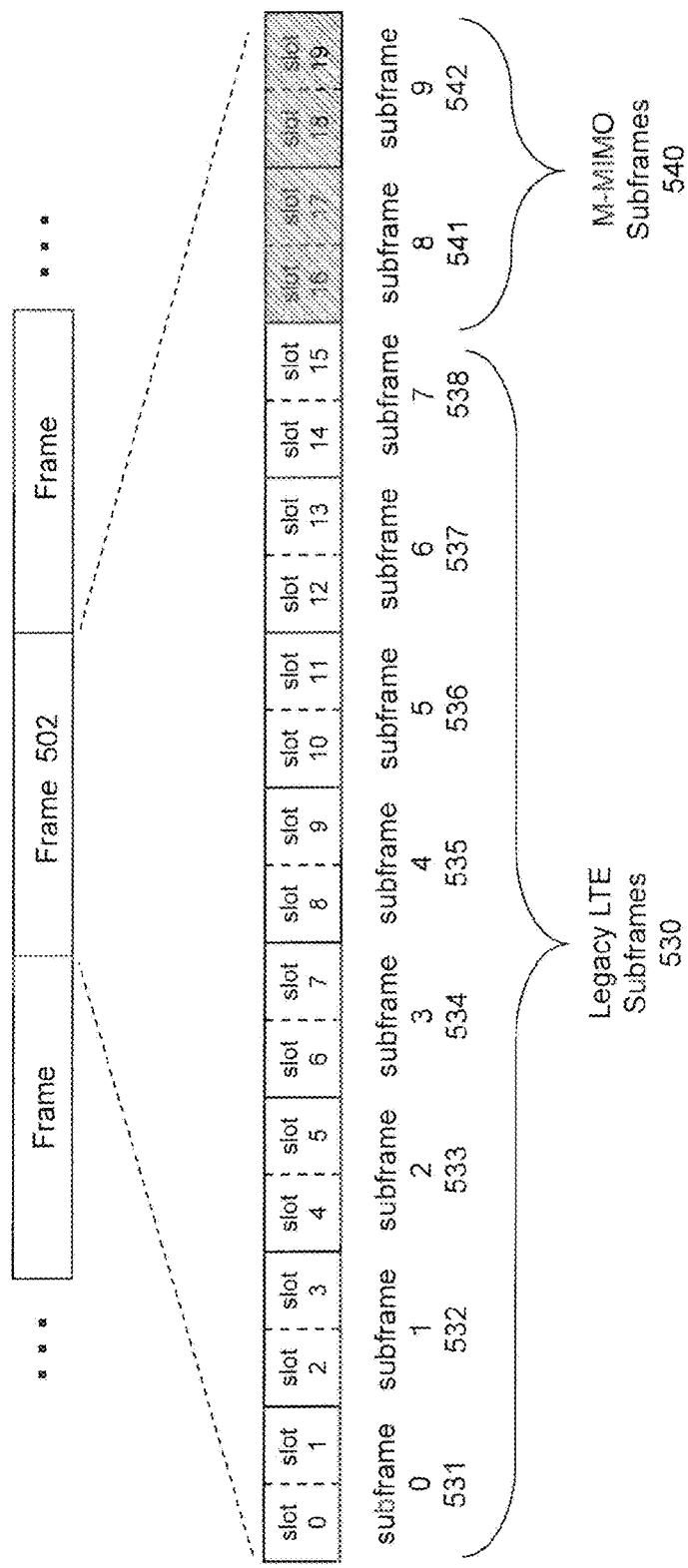
FIG. 5 depicts an LTE frame having M-MIMO partitioning in the time domain, according to an embodiment of the present disclosure.

FIG. 5 depicts an LTE frame having M-MIMO partitioning in the time domain, according to an embodiment of the present disclosure. As illustrated in FIG. 5, an LTE frame 502 is partitioned into a set of legacy LTE subframes 530 and a set of M-MIMO subframes 540 (also referred to as the M-MIMO zone). For example, eight subframes (labeled subframes 531 through 538) are reserved for legacy LTE transmission and two subframes (labeled subframes 541 and 542) are reserved for M-MIMO. Although FIG. 5 depicts an entire subframe reserved for M-MIMO transmission, a portion of a subframe (e.g., a slot or a set of symbols within a slot) could be reserved for M-MIMO transmission. As would be appreciated by persons of ordinary skill in the art, embodiments could reserve any set of downlink frames for M-MIMO transmission.

Figure 6:
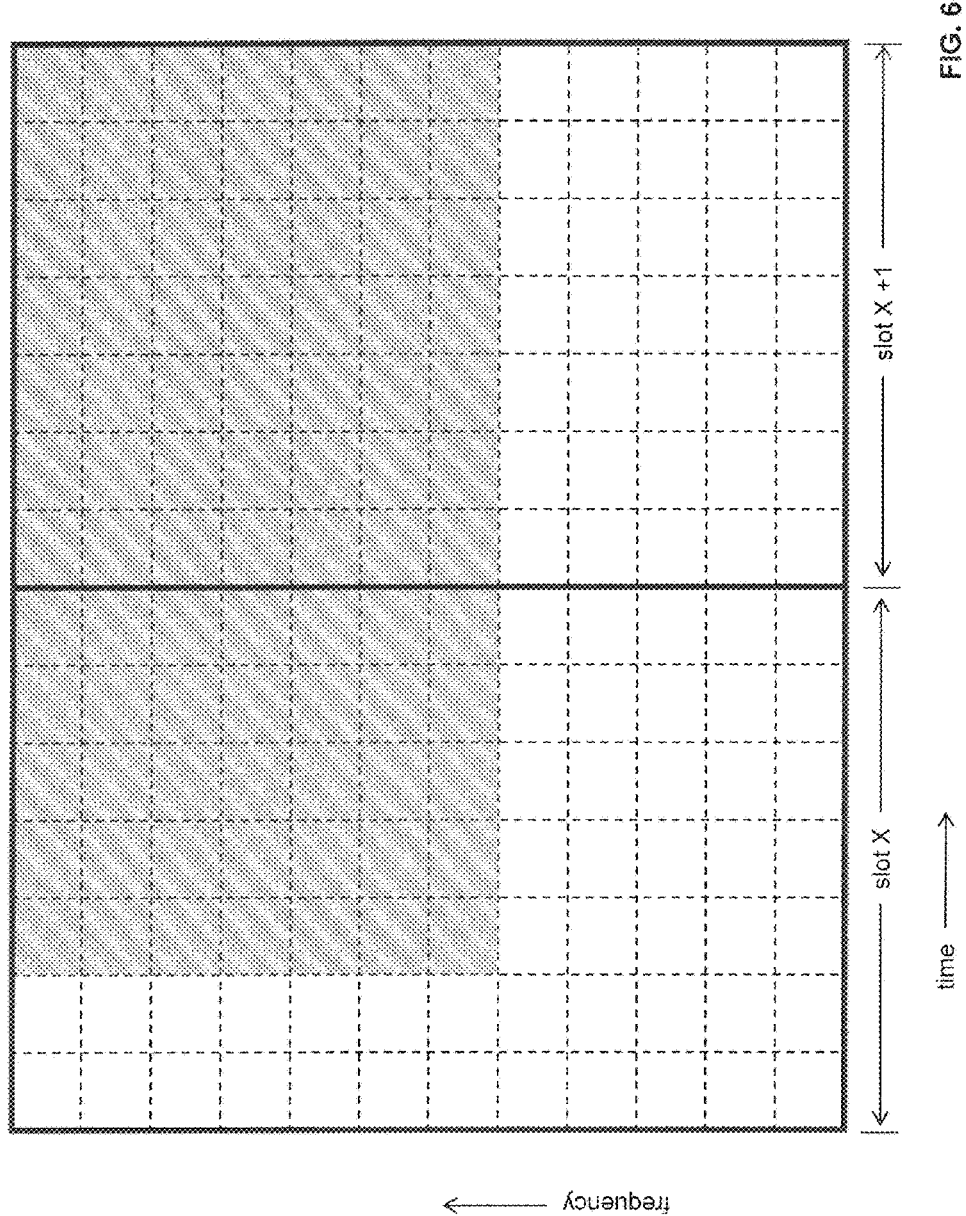
FIG. 6 depicts a portion of an LTE frame having M-MIMO partitioning in the time/frequency domain, according to embodiments of the present disclosure.

FIG. 6 depicts a portion of an LTE frame having M-MIMO partitioning in the time and frequency domains, according to embodiments of the present disclosure. As illustrated in FIG. 6, a subframe of an LTE frame having slots X and X+1 has been reserved for M-MIMO transmission. However, only a subset of the subcarriers of the subframe has been reserved for M-MIMO communications (illustrated by shading in FIG. 6). The remaining subcarriers (unshaded) are reserved for legacy LTE transmission. As would be appreciated by a person of ordinary skill in the art, the size of the transmission zone could be modified as needed by the M-MIMO system.

In embodiments of the present disclosure, a base station supporting legacy LTE and M-MIMO broadcasts control information that identifies the existence and location of one or more M-MIMO transmission zones. The M-MIMO zone identification indicates the coordinates (e.g., time and/or frequency) that define the M-MIMO transmission zone. For example, one or more of the system information blocks (SIBs) broadcast by the network could be used to provide M-MIMO transmission zone identification. In addition or alternatively, the downlink control information (DCI) could be used to convey this information.

Figure 7:
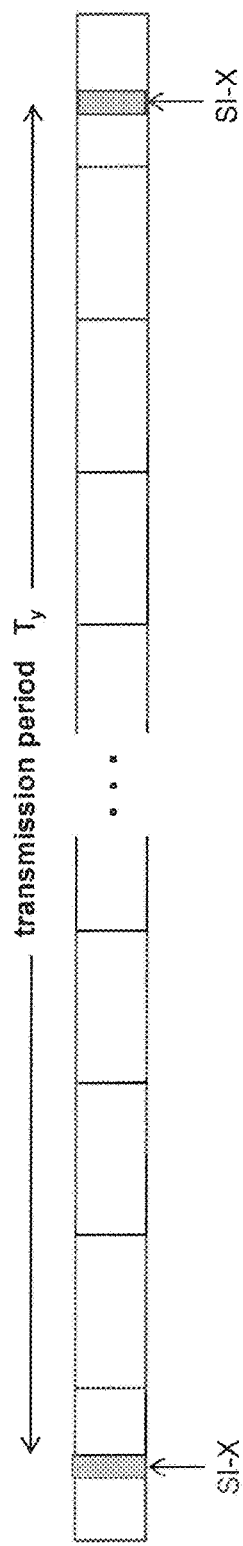
FIG. 7 depicts an exemplary transmission of SIBs including M-MIMO transmission zone identification, according to embodiments of the present disclosure.

FIG. 7 depicts an exemplary transmission of SIBs including M-MIMO transmission zone identification, according to embodiments of the present disclosure. In general, SIBs include system information to be broadcast to user devices. Currently, LTE legacy systems support a set of SIBs. As shown in FIG. 7, a SIB in the set of LTE SIBs, referred to as SIBX, can be utilized to transmit M-MIMO transmission zone identification. SIBX is included in a system information (SI) message such as SI-X illustrated in FIG. 7. Each system information (SI) message broadcast by the LTE network has a transmission period. As illustrated in FIG. 7, the SI-X message has a transmission period of $T_y$. That is, the SI-X message repeats every $T_y$ ms. Because the M-MIMO zone can only change when an SI-X message is transmitted, in this embodiment the use of SIBs to convey M-MIMO transmission zone identification can be considered static.

Figure 8:
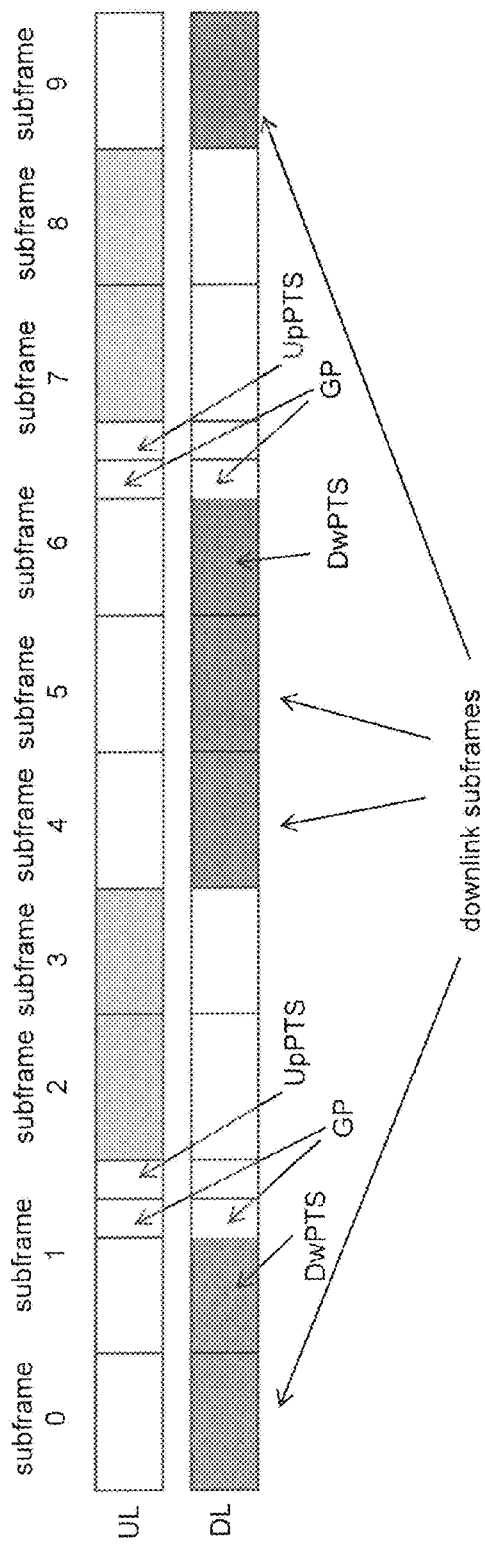
FIG. 8 depicts an exemplary configuration for uplink (UL) and downlink (DL) communication within a frame for time-division duplex (TDD) operation of LTE.
Figure 9:
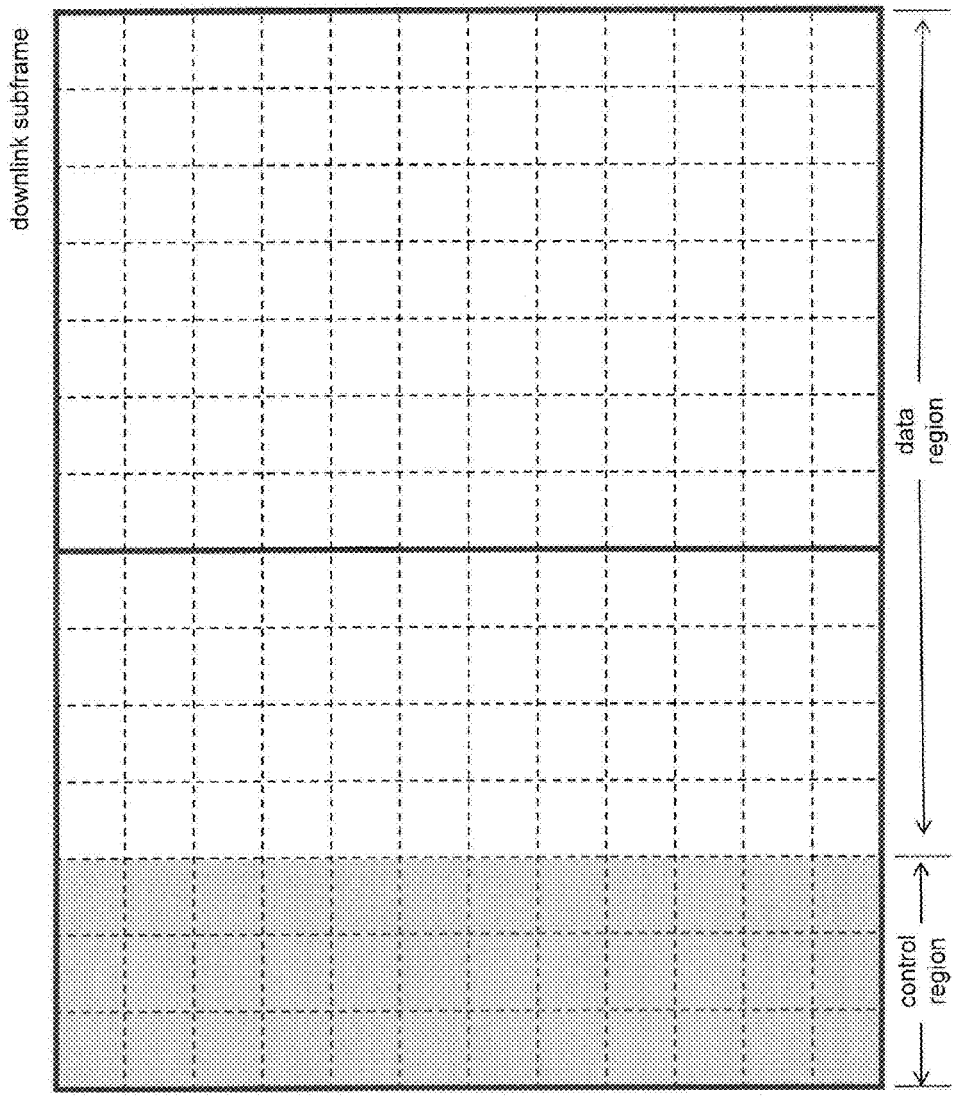
FIG. 9 depicts an exemplary downlink subframe.

M-MIMO transmission zone identification can also be transmitted using DCI. Because DCI can change on a subframe basis, the use of DCI to convey M-MIMO transmission zone identification is dynamic. FIG. 8 depicts an exemplary configuration for uplink (UL) and downlink (DL) communication within a frame when time-division duplex (TDD) operation is used by the LTE system. In the exemplary configuration shown in FIG. 8, subframes 0, 4, 5, and 9 are full downlink transmission subframes. FIG. 9 depicts an exemplary downlink subframe. As illustrated in FIG. 9, each downlink subframe of an LTE frame includes a control portion (shaded) and a data portion (unshaded). The size of the control portion is defined by OFDM symbols and can vary based on a number of factors. However, the size of the control portion is typically 4 or less OFDM symbols. The control portion of a subframe includes the physical downlink control channel (PDCCH) that is used for downlink scheduling assignments. Specifically, the PDCCH carries the DCI having the M-MIMO zone identification.

Returning to FIG. 8, subframes 2, 3, 7 and 8 are used for uplink transmission. Subframes 1 and 6 are special subframes used for switching between downlink and uplink transmission. As would be appreciated by persons of skill in the art, other configurations can be used in embodiments of the present disclosure. Note that in legacy LTE systems, subframes 0 and 5 of an LTE frame are used for downlink transmission in each configuration. As illustrated in FIG. 8, the location and size of the M-MIMO transmission zone can be changed during a frame through the use of DCI.

Figure 10:
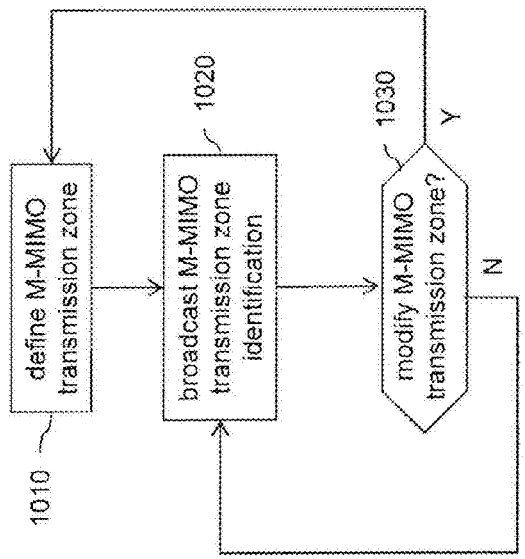
FIG. 10 depicts a flowchart of a method for supporting legacy LTE and M-MIMO coexistence from the perspective of the network interface element, according to embodiments of the present invention.

FIG. 10 depicts a flowchart 1000 of a method for supporting legacy LIE and M-MIMO coexistence from the perspective of the network interface element, according to embodiments of the present invention. Flowchart 1000 is described with reference to the embodiments of FIGS. 1-9. However, flowchart 1000 is not limited to those embodiments.

In step 1010, the M-MIMO transmission zone is defined for the cell. The M-MIMO transmission zone may be defined in time domain as illustrated in FIG. 5 (e.g., subframes 8 and 9) or by coordinates in the time and frequency domains as illustrated in FIG. 6. The M-MIMO transmission zone may be defined by a scheduler such as scheduler 114, 134 at the network interface element for the cell (e.g., a base station or eNB). Alternatively, the M-MIMO transmission zone for a cell may be defined at centralized device in the network.

In embodiments, the configuration of a M-MIMO transmission zone can be defined by coordination among the base stations (legacy and/or M-MIMO base stations). In addition or alternatively, the configuration may be based on feedback from user devices including legacy and/or M-MIMO devices. The feedback may include a variety of criteria including minimizing interference of M-MIMO transmission to legacy users or vice-versa, increasing the capacity of the system, etc.

In an embodiment, the configuration for the M-MIMO transmission zone is determined dynamically. In this embodiment, one or more base stations receives feedback or data from user devices and/or related to user devices in the cell. Using this feedback, a base station may determine whether a need exists to support both legacy users and M-MIMO users. For example, the base station (legacy base station) alone or in coordination with another base station (e.g., M-MIMO base station) may determine whether both legacy user devices and M-MIMO devices are registered with the base station. The base station can then define the configuration (e.g., subframes) that needs to be allocated for M-MIMO—legacy communications.

In a further embodiment, a legacy base station such as base station 120 may determine that it is not sending (or does not need to send) legacy data in a set of subframes. The legacy base station can then send a fixed pattern (e.g., 40-bit pattern) to one or more M-MIMO base stations indicating that the subframes identified by this pattern can be utilized to send M-MIMO data. As would be appreciated by a person of ordinary skill in the art, a M-MIMO base station, such as base station 110, can determine the pattern and communicate the pattern to one or more legacy base stations.

In an additional embodiment, a set of M-MIMO transmission zones is pre-defined for the network (or for the cell). This is similar to the technique used for DL-UL configuration in TDD. Each of the M-MIMO transmission zones is associated with an identifier. The set of M-MIMO transmission zones is shared with the base stations and user devices. When legacy-M-MIMO communication is required, the base station transmits indicator bits to the user devices using the DCI in step 1020, for example. This permits the network to dynamically switch among configurations in the set of configurations as needed.

In step 1020, the M-MIMO zone identification is broadcast. As discussed above. M-MIMO zone identification is broadcast as control information. In an embodiment, the M-MIMO zone identification is broadcast in one of the SIBs for the cell. In another embodiment, the M-MIMO zone identification is broadcast in DCI for a subframe.

In step 1030, a determination is made whether to alter the M-MIMO transmission zone identification for the cell. If the M-MIMO transmission zone identification is to be altered, operation returns to step 1010 and a new M-MIMO transmission zone is identified for the cell. The new M-MIMO transmission zone is then broadcast in step 1020. If the M-MIMO transmission zone identification is not to be altered, operation returns to step 1020 and the existing M-MIMO zone identification is rebroadcast.

FIG. 11 depicts a flowchart 1100 of a method for supporting legacy LTE and M-MIMO coexistence from the perspective of the user device, according to embodiments of the present invention. Flowchart 1100 is described with reference to the embodiments of FIGS. 1-9. However, flowchart 1100 is not limited to those embodiments.

In step 1110, the user device receives control information broadcast from the network. As described above, the control information may be sent as in a SIB or in the DCI. The control information indicates to the user device the location of the M-MIMO transmission zone. For example, the control information may indicate a subframe, slot, and/or symbol and length for the control information or may indicate a set of subcarriers in addition to a subframe, slot, and/or symbol and length for the control information. If the user device 102 is a legacy UE such as UL 102*a* of FIG. 1, the legacy UE 102*a* may not be able to interpret the M-MIMO control information and thus may ignore the M-MIMO control information.

In step 1120, a determination is made whether the user device is a M-MIMO user device. If the user device is a M-MIMO device, operation proceeds to step 1130. If the user device is a non M-MIMO device, operation proceeds to step 1125. Note that this step is optional. A non M-MIMO device may proceed directly to step 1125 from step 1110 and a M-MIMO device may proceed directly to 1130.

In step 1125, the legacy LTE data is received during the legacy LTE transmission zone. If the device does not support M-MIMO, the device will not be able to understand data transmitted during the M-MIMO zone. The non M-MIMO device may ignore the M-MIMO transmission zone data.

In step 1130, a determination is made by the M-MIMO user device whether sleep mode is supported and enabled. In embodiments, a M-MIMO user device may enter a sleep state where components are shut down during legacy LTE transmission. If sleep mode is supported and enabled, operation proceeds to step 1140. If sleep mode is not supported or is not enabled, operation proceeds to step 1145. Steps 1130-1140 are optional.

In step 1140, sleep mode is initiated during legacy LTE transmission. During sleep mode, the M-MIMO user device shuts down unnecessary components such as transmitter circuitry during reception of legacy LTE transmission. The UE wakes-up necessary circuitry in advance to receive the M-MIMO transmission.

In step 1145, a legacy LTE transmission is received by the M-MIMO user device. In embodiments, M-MIMO user device ignores all or a portion of the received legacy transmission.

In step 1150, the M-MIMO user device receives and processes M-MIMO data during the M-MIMO transmission zone.

Note that M-MIMO device can also receive information from the legacy base station.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include non-transitory machine-readable mediums such as read only memory (ROM); random access memory (RAM); magnetic disk storage media; optical storage media; flash memory devices; and others. As another example, the machine-readable medium may include transitory machine-readable medium such as electrical, optical, acoustical, or other forms of propagated signals (e.g., carrier waves, infrared signals, digital signals, etc.). Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Although the Figures described throughout the present disclosure describe interoperation between various elements, no connections or couplings are shown between these elements for clarity. As will be appreciated by those of ordinary skill in the art, the elements illustrated in FIG. 1 may be coupled to one another using any wired and/or wireless connections and may utilize any type and number of communication protocols to facilitate the described functionality without departing from the spirit and scope of the present disclosure.

What is claimed is:

1. A method, in a network interface device, for supporting both non-massive multiple input, multiple output (MIMO) and massive MIMO communications, comprising:

defining, at the network interface device a massive MIMO transmission zone within a non-massive MIMO transmission frame based on feedback from a user device, wherein the massive MIMO transmission zone comprises massive MIMO reference signals interspersed with massive MIMO downlink data; and transmitting an identification of a location of the massive MIMO transmission zone in a control information broadcast.

2. The method of claim 1, wherein defining the massive MIMO transmission zone comprises defining the location for the massive MIMO transmission zone in a time domain of the non-massive MIMO transmission frame.

3. The method of claim 1, wherein defining the massive MIMO transmission zone comprises defining the location for the massive MIMO transmission zone in a time domain and a frequency domain of the non-massive MIMO transmission frame.

4. The method of claim 1, wherein transmitting the identification of the location of the massive MIMO transmission zone comprises transmitting the identification of the location of the massive MIMO transmission zone in a system information message.

5. The method of claim 1, wherein transmitting the identification of the location of the massive MIMO transmission zone comprises transmitting the identification of the location of the massive MIMO transmission zone in downlink control information within the non-massive MIMO transmission frame.

6. The method of claim 1, wherein the network interface device is a base station.

7. The method of claim 1, wherein the network interface device is an evolved Node B (eNB) element.

8. The method of claim 1, wherein the massive MIMO transmission zone spans a plurality of symbol periods and a plurality of subcarriers.

9. The method of claim 1, further comprising:

determining whether to change the location of the massive MIMO transmission zone; and transmitting an identification of the changed location of the massive MIMO transmission zone in a subsequent control information broadcast.

10. A method, in a user device, for supporting both non-massive multiple input, multiple output (MIMO) and massive MIMO communications, comprising:

receiving, in the user device, control information identifying a location for a massive MIMO transmission zone within a non-massive MIMO transmission frame, wherein the massive MIMO transmission zone is defined by a network interface device based on feedback from the user device; and decoding massive MIMO downlink data when the massive MIMO transmission zone is received.

11. The method of claim 10, further comprising:

determining whether sleep mode is enabled for the user device; and entering sleep mode during reception of non-massive MIMO data when sleep mode is enabled for the user device.

12. The method of claim 10, wherein the control information is a system information block.

13. The method of claim 12, wherein the control information is downlink control information.

14. The method of claim 12, wherein the location of the massive MIMO transmission zone is defined in a time domain of the non-massive MIMO transmission frame.

15. The method of claim 12, wherein the location of the massive MIMO transmission zone is defined in a time domain and a frequency domain of the non-massive MIMO transmission frame.

16. A network interface device comprising:
- a massive multiple input, multiple output (MIMO) antenna array;
- a non-massive MIMO antenna configuration; and
- a processor configured to:
  - define a massive MIMO transmission zone within a non-massive MIMO transmission frame based on feedback from a user device, wherein the massive MIMO transmission zone comprises massive MIMO reference signals interspersed with massive MIMO downlink data, and
  - transmit an identification of a location of the massive MIMO transmission zone in a control information broadcast.

17. The network interface device of claim 16, wherein the processor is configured to define the massive MIMO transmission zone in a time domain of the non-massive MIMO transmission frame.

18. The network interface device of claim 16, wherein the processor is configured to define the massive MIMO transmission zone in a time domain and a frequency domain of the non-massive MIMO transmission frame.

19. The network interface device of claim 16, wherein the processor is configured to transmit the identification of the location of the massive MIMO transmission zone in a system information message.

20. The network interface device of claim 16, wherein the processor is configured to transmit the identification of the location of the massive MIMO transmission zone in downlink control information within the non-massive MIMO transmission frame.

* * * * *